Oct. 5, 1965    TETSUZO FUKUTOME    3,209,727
PULSATOR COMBINED WITH A MILK CLAW

Filed Oct. 31, 1961    4 Sheets-Sheet 1

INVENTOR
TETSUZO FUKUTOME

BY
ATTORNEYS

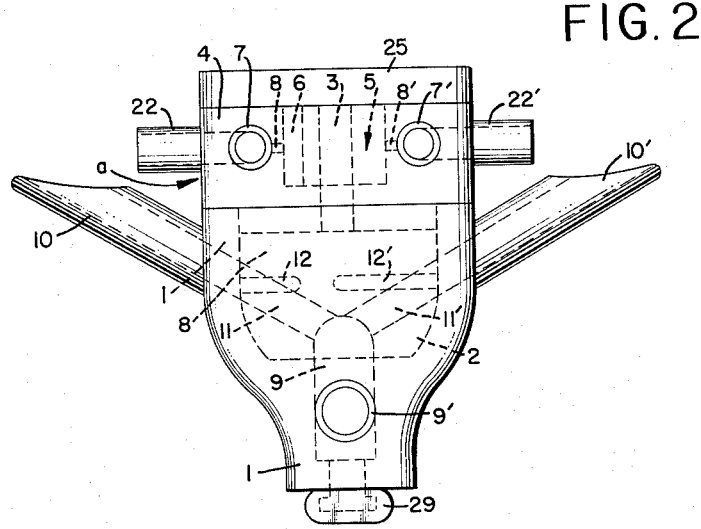
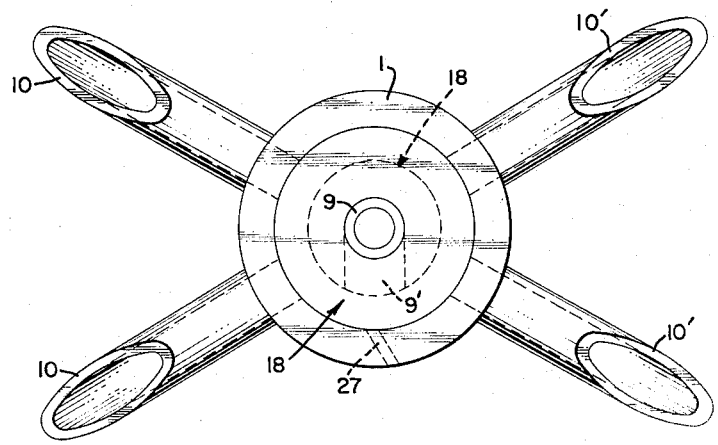
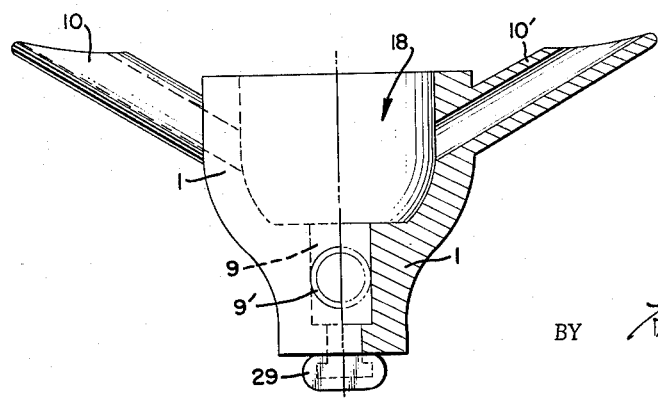

Oct. 5, 1965  TETSUZO FUKUTOME  3,209,727
PULSATOR COMBINED WITH A MILK CLAW
Filed Oct. 31, 1961  4 Sheets-Sheet 3

INVENTOR
TETSUZO FUKUTOME

BY *Hall & Hughes*

ATTORNEYS

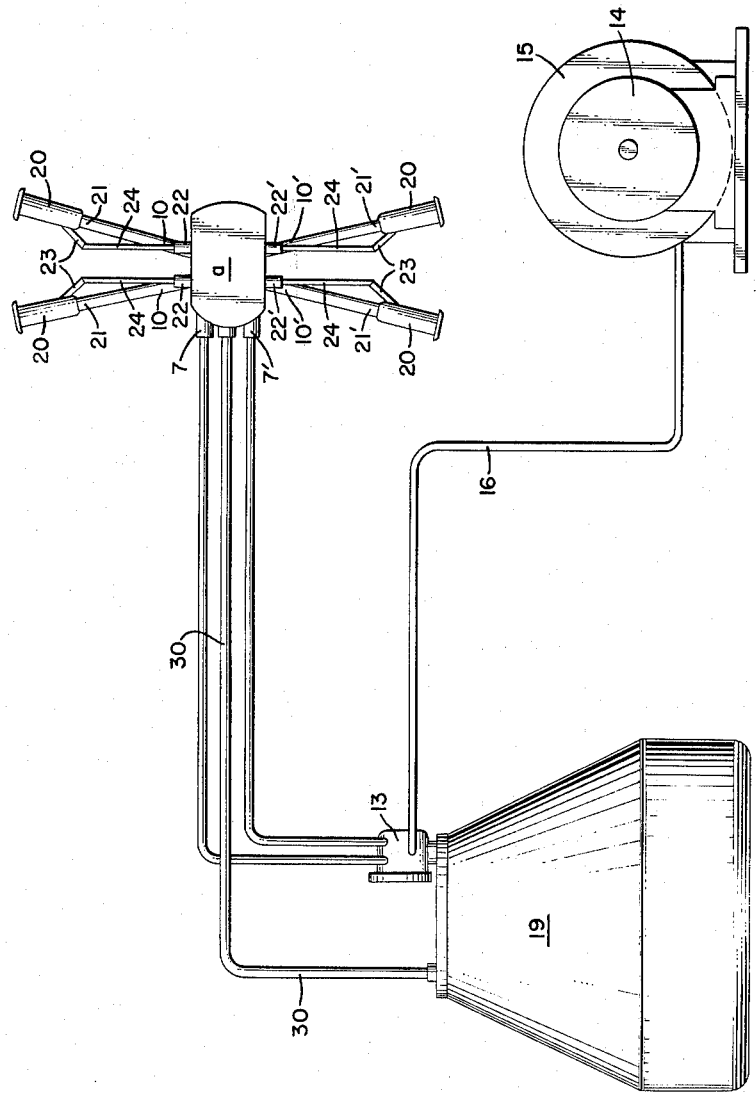

United States Patent Office 3,209,727
Patented Oct. 5, 1965

3,209,727
PULSATOR COMBINED WITH A MILK CLAW
Tetsuzo Fukutome, 77 3-chome, Ikuno-ku,
Osaka, Japan
Filed Oct. 31, 1961, Ser. No. 149,055
2 Claims. (Cl. 119—14.37)

This invention relates to a pulsator combined with a milk claw for a milking machine or milker, and more particularly to such an apparatus having a rotary valve operated by a swinging vane instead of a piston.

According to this invention, there is provided a pulsator combined with a milk claw for a milking machine which comprises a main rotary valve body having a rotative element having a shaft extended out thereon, a partition wall having passages and a chamber, said chamber having a swing fitting tightly to said shaft so that the action of the swing and the movement of said rotary element is correlated with each other, said passages and the chamber being interconnected with small holes, means to move the swing toward the vacuum or inspiratory side thereof when the vacuum action is given to either one of said passages so as to rotate said rotative element, a milking tube and milking connecting pipes provided in said main body, and means to connect said tube and said pipes by means of milk holes of a rotative element while connecting the other connecting pipe or pipes with atmospheric air by means of air holes of said rotative element so as to exert vacuum action alternately with said passages thereby effecting milking operation continuously.

The conventional milking machines often have pistons in their milk claws. Contrary to this, the milk claw of this invention has a swinging vane instead of the piston, which vane will make it possible to bring about the same functions and advantages as those of the conventional milk claws.

Briefly, this invention provides a chamber having a swinging vane operationally connected with a rotary element and subjects vacuum action alternately to each side of the swing member so as to permit a reciprocating or oscillating action of the rotative element.

Figure 1:
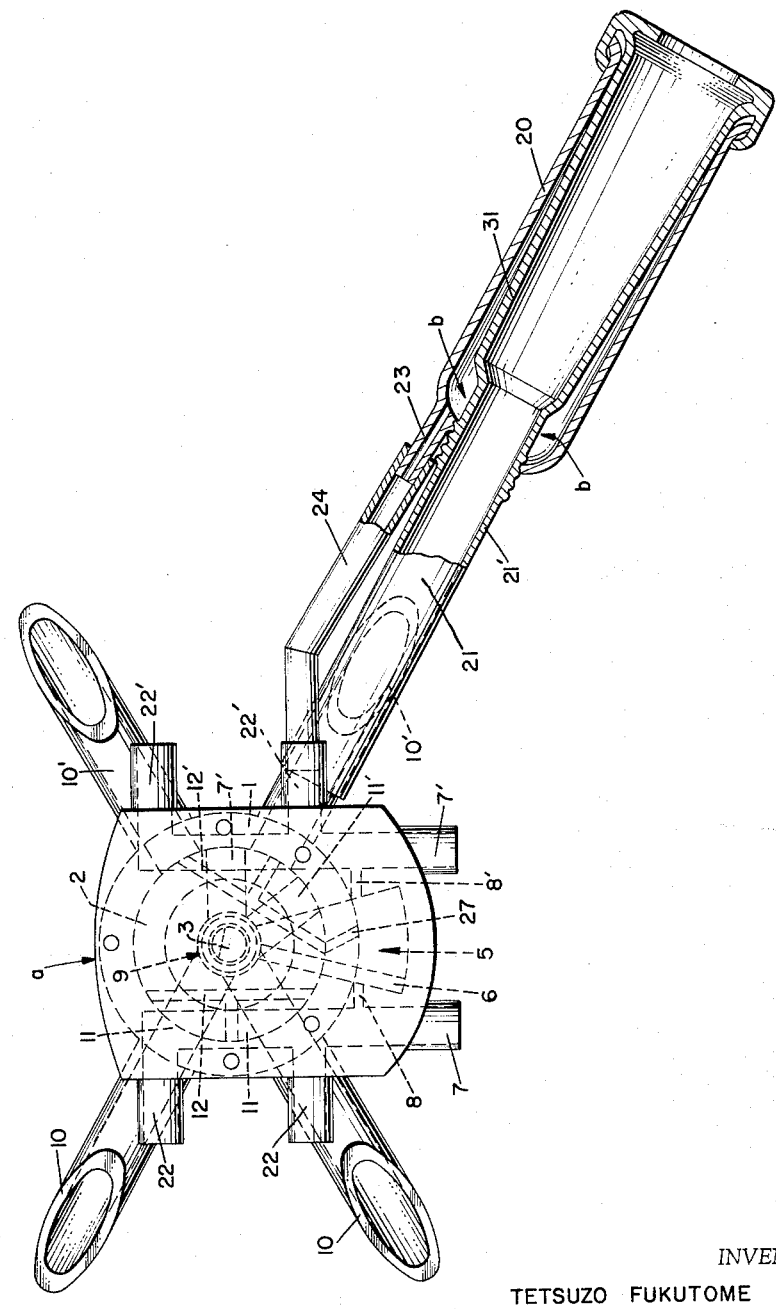
Figure 5:
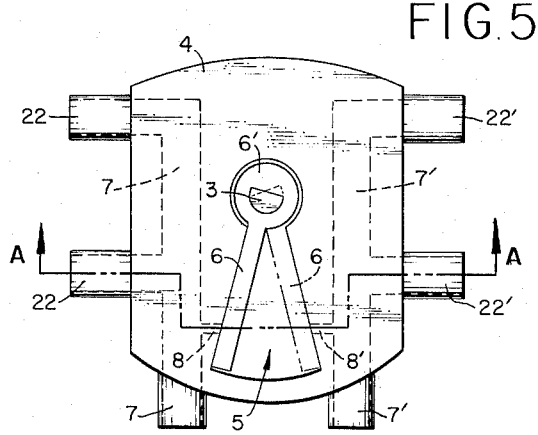
Figure 6:
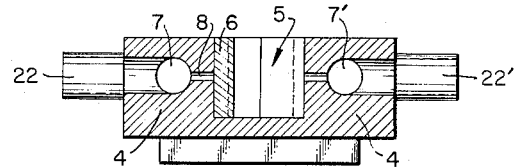
Figure 7:
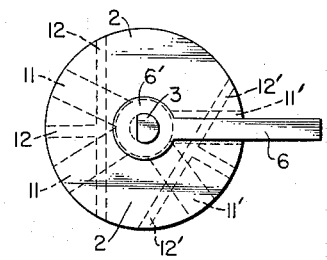
Figure 8:
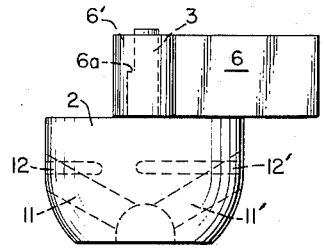

This invention is further described in connection with the accompanying drawings of a preferred embodiment thereof, in which:

FIG. 1 is a plan view of the pulsator of this invention.
FIG. 2 is a side view of the pulsator shown in FIG. 1.
FIG. 3 is a plan view of the main part of the milk claw.
FIG. 4 is a side view of FIG. 3 with the right portion shown in section.
FIG. 5 is a plan view of the vacuum responsive swing element of said milk claw.
FIG. 6 is a sectional view taken along reference line A—A of FIG. 5.
FIG. 7 is a plan view of the rotary element of the milk claw.
FIG. 8 is a side elevational view of FIG. 7.
FIG. 9 is a schematic view of an embodiment of a milking apparatus in which the milk claw of the present invention is used.

Of the drawings, FIG. 9 is a schematic view of a milker in which a pulsator $a$ of this invention is used. For further details, the reference numeral 19 is a receiver or reservoir for the milk collected and 13 is a pulsator or regulator for milking placed thereon. 14 is a motor and 15 is a source of suction pressure in the form of a vacuum pump connected directly with the motor. The pulsator 13 is connected with the pump 15 via a pipe 16. With an aid of sucking action of the pump 15 the pulsator or regulator 13 actuates via conduits an operation diaphragm or inflation in a milking cylinder or teat cup and also a necessary degree of vacuum is maintained inside the receiver 19. The pulsator $a$ has four connecting pipes 10, 10, 10′ and 10′ projected on both sides thereof and opened into a valve chamber 18 (FIG. 4) for the valve rotor 8 (FIG. 8). The pipes 10, 10, 10′ and 10′ are connected to the milking cylinders or nozzles 20 via tubes 21. In other words, said pipes 10, 10, 10′ and 10′ are connected to pipes 21′ in the cylinders 20 (FIG. 1) so that the milk taken from the udder of a milk cow is carried through the pipes 21′ to each of the pipes 10, 10, 10′ and 10′.

As shown in FIG. 7 and FIG. 8, the alternating valve includes a rotary element 2 which is of a size just fitting in the chamber 18 and rotatable therein. In element 2 are provided milk holes 11 and 11′ to register with the pipes 10, 10, 10′ and 10′ of the main body 1. Thus, when the holes 11 and 11 of the element 2 register with the pipes 10 and 10, the other holes 11′ and 11′ are kept apart from the other pipes 10′ and 10′ so that the ends of the latter pipes 10′ and 10′ are covered with the peripheral surface of the element 2. The numerals 12 and 12′ are air holes also provided in the element 2. As shown in FIG. 1, when the milk holes 11 and 11 are positioned interconnecting with the pipes 10 and 10, the air holes 12 on that side are covered with the inner wall of the chamber 18 while the other air holes 12′ are interconnected with the pipes 10′ and 10 as well as with an atmospheric passageway 27 provided in the wall of the chamber 18, so that atmospheric pressure is maintained in the pipes 10′ and 10′. On the partition wall 4 there is provided a fan-shaped chamber 5, through the bottom of which a shaft 3 of the rotary element 2 is extended.

As shown in FIG. 7 and FIG. 8, the tip of the shaft 3 is circular in section but with a notch 6a in it. To this shaft 3 is fitted the bottom 6′ of a swinging vane 6 so that the shaft 3 and the oscillating swing member 6 are made integral. The swing member 6 is pivoted on the shaft 3 for reciprocating in the chamber 5. Also there are provided inspiratory passages 7 and 7′ on both sides of the partition wall 4 and leading pipes 22 and 22′ are branched out from passages 7 and 7′. These pipes 22 and 22′ are connected with inspiratory tubes 23 of the cylinders 20 by means of pipes 24. Accordingly, it is possible to suck air inside a gap $b$, see FIG. 1, between the wall of the cylinder 20 and an operation diaphragm 31 by means of the tube 23 so as to actuate the diaphragm 31 to take out the milk from the cow. The numerals 8 and 8′ are small holes for connecting the passages 7 and 7′ with the chamber 5 and open to both sides of the wider portion of said chamber. The numeral 25 is a cover plate which is placed on the partition wall 4 and 29 is a cock provided in a milking tube 9 of the body 1 for connecting or disconnecting the tube 9 with another tube 9′.

The operation of the above mentioned apparatus is as follows.

Since the passages 7 and 7′ are subjected to an alternate suction by air and the tube 9 is connected directly with the receiver 19 via a pipe 30, when the passage 7 is under suction and the passage 7′ is not subjected to the sucking action, the pipes 22 are under vacuum action so that the air in the gaps $b$ of the cylinders 20 are sucked via the pipes 24 so as to cause the milk to be removed from the cow. As the pipes 21′ of the cylinders 20 are connected to the pipes 10, the evacuating action inside the receiver 19 affects the pipes 21′ so as to carry the recovered milk to the receiver 19 through the pipes 21′ (pipes 21), the pipes 10, the holes 11, the tube 9 and the pipes 9′ and 30 and store the same therein. At that time, it is seen that the inspiratory action has been given to the left side of the chamber 5 by means of the hole 8 and the swing member 6 is in a position shown as a solid line in FIG. 5. This means that the other pipes 10' are connected with the holes 12' and the passageway 27, and thus the atmospheric pressure prevails inside the diaphragm 31 and the milking operation does not take place therein. Then the inspiratory action is given to the passages 7' while it is stopped in the passages 7 so that the air in the chamber 5 is sucked through the hole 8' and evacuated on the right side of the swing 6. Thus, the swing member 6 moves pivotally to the right side, which results in rotation of the element 2. Then the milk holes 11 and 11 are disconnected from the pipes 10 and 10 and the air holes 12 are connected therewith while the milk holes 11' are connected with the pipes 10' and the air holes 12' are disconnected therefrom. At this time, the inside of the cylinders 20 connected with the pipes 10 is under atmospheric pressure while the cylinders 20 connected with the pipes 10' are under milking operation. The above stated action can be repeated by means of the operation of the regulator 13 or the alternate action of the passages 7 and 7' so that the milking operation can be conducted smoothly in a continuous manner.

The present invention is not limited to the embodiment described above though preferable, and various modifications can be given without departing from the spirit of this invention.

What is claimed is as follows:

1. A device for a milking machine, comprising, in combination:
   (a) a main body having two milk conduits therein;
   (b) an element mounted for rotation in said body and having a shaft projecting therefrom, said element having two air holes and two milk holes therein and a milk outlet connected to said milk holes, said element being arranged to provide communication between
      (1) one milk hole and one milk conduit in one position thereof and
      (2) another milk hole and another milk conduit in another position thereof;
   (c) a partition wall into which said shaft projects, said wall having a chamber and two passages therein at two spaced positions, and nozzle actuating conduits connected to said passages;
   (d) a swing member movable in said chamber between said two spaced positions, said member being fixed on said shaft and oriented to move said element between its two positions as the member moves between its two positions; and
   (e) suction means for alternate communication with said passages to draw said swing member toward the passage connected therewith for oscillating said swing member in said chamber, and thus for alternately communicating said milk holes with a respective milk conduit, and for alternately communicating said air holes with the atmosphere when an associated milk hole is not in communication with a milk conduit.

2. A milking machine, comprising, in combination:
   (a) first and second conduits;
   (b) two pressure actuated milking nozzles, each connected to be actuated by one of said conduits;
   (c) a source of suction pressure;
   (d) a pulsator for alternately communicating the first and the second conduits with said source for alternately actuating said nozzles;
   (e) a milk reservoir connected with said source for continuously providing a vacuum pressure therein; and
   (f) means for alternately communicating the actuated one of said nozzles with said reservoir for drawing milk in said nozzles into said reservoir and for controlling said valve and responsive to the pressures in said conduits to be moved back and forth and thereby move said valve, said means including
      (1) a main body having milk conduits therein each connected with a nozzle,
      (2) an element mounted for rotation in said body and having a shaft projecting therefrom, said element having two sets of air holes and two sets of milk holes therein and a milk outlet connected to said milk holes and to said reservoir,
      (3) a partition wall into which said shaft projects, said wall having a chamber and two passages therein at two spaced positions and nozzle actuating conduits connected to said passages,
      (4) a swing member fixed on said shaft and movable in said chamber between said two spaced positions, and
      (5) suction means for alternate communication with said passages to draw said swing member toward the passage connected therewith for oscillating said swing member in said chamber, said milk holes being arranged to alternately communicate with a respective milk conduit and said air holes being arranged to alternately communicate with the atmosphere when an associated milk hole is not in communication with a milk conduit.

References Cited by the Examiner

UNITED STATES PATENTS

| | | | |
|---|---|---|---|
| 1,119,214 | 12/14 | Anderson | 119—14.45 |
| 1,533,187 | 4/25 | Haygood | 119—14.29 |
| 2,219,952 | 10/40 | Forsberg | 137—103 |
| 2,827,920 | 3/58 | Rawson | 137—103 X |

SAMUEL KOREN, *Primary Examiner.*

M. CARY NELSON, CARL W. ROBINSON, HUGH R. CHAMBLEE, *Examiners.*